United States Patent
Sennoun et al.

(10) Patent No.: US 10,334,536 B2
(45) Date of Patent: Jun. 25, 2019

(54) METHOD FOR DYNAMIC ADAPTATION OF A DATA RATE

(71) Applicant: SAGEMCOM ENERGY & TELECOM SAS, Rueil Malmaison (FR)

(72) Inventors: Yassir Sennoun, Rueil Malmaison (FR); Marc Le Gourrierec, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 16/076,866

(22) PCT Filed: Feb. 20, 2017

(86) PCT No.: PCT/EP2017/053778
§ 371 (c)(1),
(2) Date: Aug. 9, 2018

(87) PCT Pub. No.: WO2017/144406
PCT Pub. Date: Aug. 31, 2017

(65) Prior Publication Data
US 2019/0053169 A1    Feb. 14, 2019

(30) Foreign Application Priority Data

Feb. 23, 2016  (FR) ..................... 16 51457

(51) Int. Cl.
*H04L 5/00* (2006.01)
*H04L 12/00* (2006.01)
*H04W 28/20* (2009.01)
*H04W 52/24* (2009.01)
(Continued)

(52) U.S. Cl.
CPC ........... *H04W 52/24* (2013.01); *H04L 5/0037* (2013.01); *H04L 5/0044* (2013.01);
(Continued)

(58) Field of Classification Search
CPC ...... H01Q 13/24; H01Q 21/205; H01Q 19/08; H04B 3/52; H04B 3/54; H04L 1/0002;
(Continued)

(56) References Cited

U.S. PATENT DOCUMENTS 6,563,822 B1 * 5/2003 Aoki ................... H04L 12/1854
370/390
2003/0078006 A1 * 4/2003 Mahany ................. G06F 1/163
455/63.1

(Continued)

OTHER PUBLICATIONS

May 16, 2017 Search Report issued in International Patent Application No. PCT/EP2017/053778.

*Primary Examiner* — Dung Hong
(74) *Attorney, Agent, or Firm* — Oliff PLC; R. Brian Drozd

(57) ABSTRACT

In the context of a dynamic adaptation of a transmission data rate of a terminal device in a wireless communication network, predefined transmission profiles that correspond to respective data rates are associated respectively with reception sensitivities. A server performs an optimization of said transmission data rate in successive stages, and decides to switch to a new stage according to a frame delivery rate with respect to a predefined threshold. The server selects the transmission profile to be applied by the terminal device while keeping at least a predefined margin, dependent on the stage at which the operation is performed, between received signal strength indication and reception sensitivity corresponding to said transmission profile.

9 Claims, 4 Drawing Sheets

(51) Int. Cl.
*H04L 12/403* (2006.01)
*H04L 12/825* (2013.01)

(52) U.S. Cl.
CPC ............ *H04L 5/0064* (2013.01); *H04L 12/00* (2013.01); *H04L 12/403* (2013.01); *H04L 47/25* (2013.01); *H04W 28/20* (2013.01)

(58) Field of Classification Search
CPC ... H04L 43/106; H04L 1/0006; H04L 1/0009; H04W 52/265
See application file for complete search history.

(56) References Cited

U.S. PATENT DOCUMENTS

| | | | | |
|---|---|---|---|---|
| 2005/0039103 | A1* | 2/2005 | Azenko | H03M 13/1515 |
| | | | | 714/776 |
| 2005/0138524 | A1* | 6/2005 | Cioffi | H04B 3/32 |
| | | | | 714/758 |
| 2005/0286562 | A1* | 12/2005 | Nakao | H04L 1/0006 |
| | | | | 370/477 |
| 2008/0219290 | A1* | 9/2008 | Cioffi | H04L 5/14 |
| | | | | 370/465 |
| 2008/0238629 | A1* | 10/2008 | Gonikberg | H04L 1/0002 |
| | | | | 340/10.4 |
| 2010/0041349 | A1* | 2/2010 | Mahany | H04W 74/06 |
| | | | | 455/88 |
| 2015/0103785 | A1* | 4/2015 | Jung | H04W 72/087 |
| | | | | 370/329 |
| 2016/0278104 | A1* | 9/2016 | Hiremath | H04L 49/90 |
| 2018/0227142 | A1* | 8/2018 | Horsley | H04M 11/062 |

* cited by examiner

| SF | SL (dBm) |
|---|---|
| SF12 | -140 |
| SF11 | -137 |
| SF10 | -134 |
| SF9 | -131 |
| SF8 | -128 |
| SF7 | -125 |

Fig. 4

| ID | N | TH1(%) | TH2(%) | K | M1 | M2 |
|---|---|---|---|---|---|---|
| 1 | 1 | 100% | N/A | 0 | 20dB | 10dB |
| 2 | 10 | 90% | 70% | 1 | 12dB | 6dB |
| 3 | 100 | 95% | 75% | 3 | 6dB | 3dB |
| 4 | 300 | 98% | 75% | 10 | 3dB | 3dB |

Fig. 5

METHOD FOR DYNAMIC ADAPTATION OF A DATA RATE

The present invention relates to a dynamic adaptation of a transmission data rate of a terminal device in a wide area network of the LPWAN ("Low-Power Wide-Area Network") type.

The Internet of Things is emerging. The Internet of Things represents the extension of the Internet to things and places in the physical world. Whereas the Internet does not normally extend beyond the electronic world, the Internet of Things represents exchanges of information and data coming from devices present in the real world to the Internet, such as for example for collecting electricity consumption or water consumption readings. The Internet of Things is considered to be the third evolution of the Internet, referred to as Web 3.0. The Internet of Things is partly responsible for the current growth in the volume of data to be transmitted and stored and thus gives rise to what is called "Big Data". The Internet of Things has a universal character for designating connected objects with varied uses, for example in the industrial, food, e-health or home-automation fields.

To enable communicating objects to communicate in the context of the Internet of Things, gathering gateways situated on geographically high points are deployed by an operator. Apart from maintenance operations, these gateways are typically fixed and permanent. Mention can be made for example with regard to this model of the SigFox (registered trade mark) or ThingPark (registered trade mark) networks. These gathering gateways communicate with the communicating objects thanks to medium- or long-range radio communication systems of the LPWAN type, such as for example the LoRaWAN (registered trade mark, "Long-Range Wide-Area Network") technology, also known by the abbreviation "LoRa" (registered trade mark, "Long Range"), from the name of the alliance promoting long-range wide-area network LoRaWAN (registered trade mark) technologies. These gateways further serve as relays between the communicating objects and a server (the core network) configured to process information sent by the communicating objects or for sending commands to said communicating objects.

Such commands sent by the server to said communicating objects relate for example to transmission rate adjustments via spread factor SF and/or transmission power (TxPower) level adjustments, which therefore enables applying adaptive data rate ADR policies. One particularity of medium- or long-range radio communication networks of the LPWAN type is that the choice of the rate and/or of the transmission level of each communicating object is made by the server rather than locally between said communicating object and a gathering gateway with which said communicating object is connected. This choice is made on the basis of received signal strength indications (RSSI) for data frames received from said communicating object. However, this requires the server having significant memory resources for storing the received signal strength indications RSSI for a large mass of frames received, and this for each communicating object that is under the control of said server.

In addition, one difficulty with adaptive data rate ADR policies is avoiding untimely changes in configuration of the communicating objects.

It is desirable to overcome these drawbacks of the prior art, which are found more generally in wireless communication networks.

The invention relates to a method for dynamic adaptation of a transmission data rate of a terminal device in a wireless communication network, the method being executed by a server in said network, predefined transmission profiles that correspond to respective data rates being associated respectively with reception sensitivities, said reception sensitivities representing minimum signal reception levels for decoding the signals transmitted respectively according to said predefined transmission profiles. The method is such that the server performs an optimisation of said transmission data rate in successive stages, and each stage defines: a quantity N of frames to be analysed, a first frame delivery rate threshold TH1, a second frame delivery rate threshold TH2 lower than said first threshold TH1, a first margin M1, and a second margin M2 less than or equal to said first margin M1, so that said quantity N of each stage is less than or equal to said quantity N of the following stage, said first margin M1 of each stage is smaller than or equal to said first margin M1 of the following stage, and said second margin M2 of each stage is smaller than or equal to said second margin M2 of the following stage. In addition, the optimisation is performed according to a current stage, and the server performs the following steps: retaining a received signal strength indication for each frame received in a series of N frames transmitted by the terminal device; determining a frame delivery rate for said series of N frames; when the determined frame delivery rate is greater than or equal to said first threshold TH1 of the current stage, switching to the following stage, and selecting the transmission profile to be applied to said terminal device while keeping at least the second margin M2 of the current stage between the retained received signal strength indication and the reception sensitivity corresponding to said transmission profile; when the determined frame delivery rate is lower than said first threshold TH1 of the current stage and is higher than said second threshold TH2 of the current stage, selecting the transmission profile to be applied to said terminal device while keeping the first margin M1 of the current stage between the retained received signal strength indication and the reception sensitivity corresponding to said transmission profile; and, when the determined frame delivery rate is below or equal to said second threshold TH2 of the current stage, stopping or reinitialising the optimisation. Thus, the approach by stage allows gradual optimisation of the transmission profile of said terminal device, by applying more and more restricted margins, and avoids untimely configurations of said terminal device.

According to a particular embodiment, each stage further defines a quantity K of worst received signal strength indications to be rejected by series of N frames, and, for retaining a received signal strength indication for each frame received in a series of N frames transmitted by the terminal device, the server stores the K+1 worst indications of the received signal strength for said series of N frames, and the server retains the best received signal strength indication among the stored received signal strength indications. Thus, it is only necessary to store the K+1 worst received signal strength indications for said series of N frames, which is advantageous in terms of memory resource consumption.

According to a particular embodiment, the optimisation begins with an initialisation stage not defining any second frame delivery rate threshold TH2. Thus, the initialisation stage enables initiating the optimisation.

According to a particular embodiment, the optimisation ends with a final stage and, when the optimisation is performed according to the final stage: when the determined frame delivery rate is higher than or equal to said first threshold TH1 of said final stage, selecting the transmission profile to be applied to said terminal device while keeping at least the second margin M2 of the final stage between the retained received signal strength indication and the reception sensitivity corresponding to said transmission profile, and requesting said terminal device to reduce a transmission power level.

According to a particular embodiment, the transmission data rate is represented by a spread factor of a CSS (Chirp Spread Spectrum) modulation.

According to a particular embodiment, the wireless communication network is a long-range wide-area network of the LPWAN type, the wireless communication network connects the terminal device to at least one gathering gateway serving as a relay with the server, and the server receives each frame relayed by each gathering gateway in association with a received signal strength indication determined by said gathering gateway on reception of said frame.

According to a particular embodiment, the wireless communication network implements the LoRaWAN protocol.

The invention also relates to a server configured to perform a dynamic adaptation of a transmission data rate of a terminal device in a wireless communication network, predefined transmission profiles that correspond to respective data rates being associated respectively with reception sensitivities, said reception sensitivities representing minimum signal reception levels for decoding signals transmitted respectively according to said predefined transmission profiles. The server is configured to perform an optimisation of said transmission data rate in successive stages, and each stage defines: a quantity N of frames to be analysed, a first frame delivery rate threshold TH1, a second frame delivery rate threshold TH2 lower than said first threshold TH1, a first margin M1, and a second margin M2 smaller than or equal to said first margin M1, so that said quantity N of each stage is less than or equal to said quantity N of the following stage, said first margin M1 of each stage is less than or equal to said first margin M1 of the following stage, and said second margin M2 of each stage is less than or equal to said second margin M2 of the following stage. In addition, the server is configured, when the optimisation is performed according to a current stage, to: retain a received signal strength indication for each received frame in a series of N frames transmitted by the terminal device; determine a frame delivery rate for said series of N frames; when the determined frame delivery rate is greater than or equal to said first threshold TH1 of the current stage, switch to the following stage, and select the transmission profile to be applied to said terminal device while keeping at least the second margin M2 of the current stage between the retained received signal strength indication and the reception sensitivity corresponding to said transmission profile; when the determined frame delivery rate is lower than said first threshold TH1 of the current stage and is higher than said second threshold TH2 of the current stage, select the transmission profile to be applied to said terminal device while keeping the first margin M1 of the current stage between the retained received signal strength indication and the reception sensitivity corresponding to said transmission profile; and, when the determined frame delivery rate is less than or equal to said second threshold TH2 of the current stage, stop or reinitialise the optimisation.

The invention also relates to a computer program, which can be stored on a medium and/or downloaded from a communication network, in order to be read by a processor. This computer program comprises instructions for implementing the method mentioned above, when said program is executed by the processor. The invention also relates to an information storage medium storing such a computer program.

The features of the invention mentioned above, as well as others, will emerge more clearly from a reading of the following description of an example embodiment, said description being given in relation to the accompanying drawings, among which:

FIG. 4 illustrates schematically a look-up table between spread factors and respective reception sensitivity levels;

FIG. 5 illustrates schematically a stage-parameter definition table to be used in the context of a dynamic transmission data rate adaptation.

Figure 1:
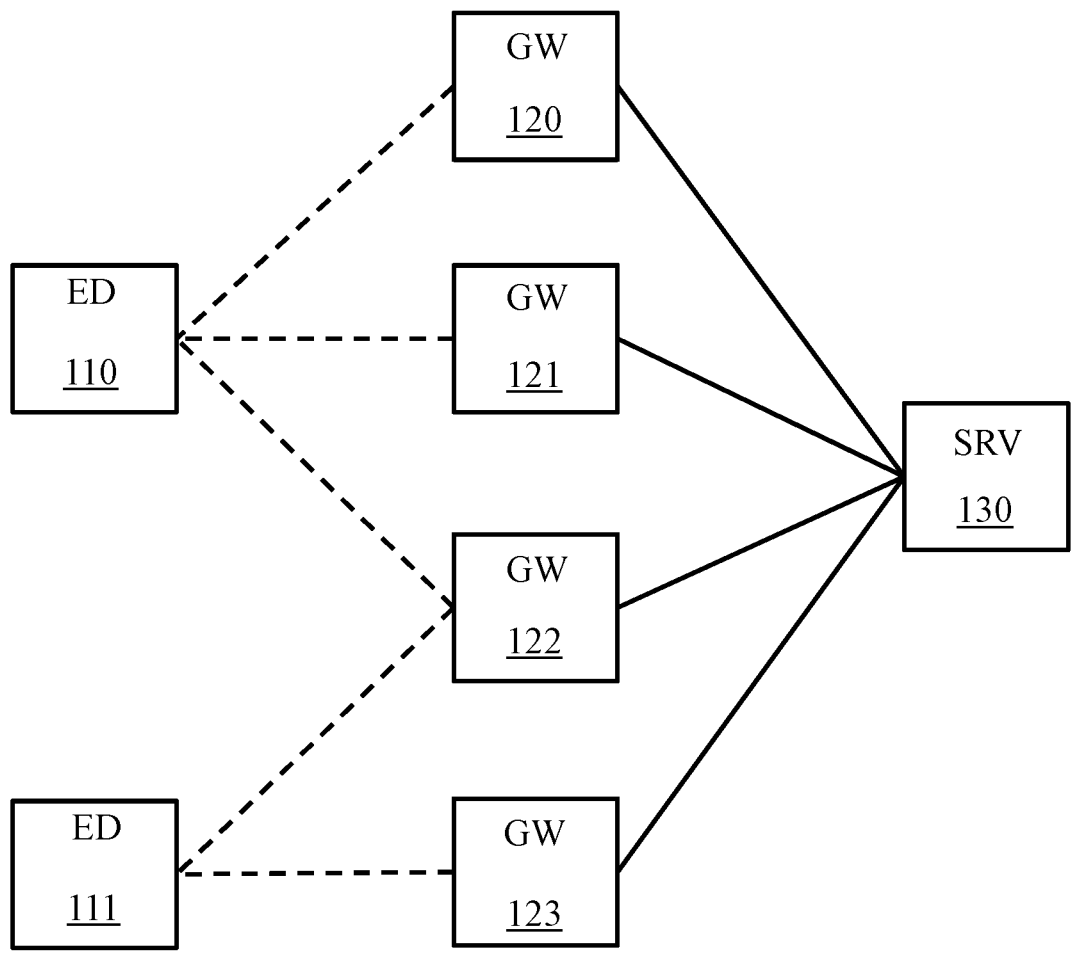
FIG. 1 illustrates schematically a communication system in which the present invention may be implemented.

The communication system comprises a plurality of gathering gateways 120, 121, 122, 123. The gathering gateways 120, 121, 122, 123 have respective communication links with a server 130 to which said gathering gateways are attached. According to a particular embodiment, each gathering gateway 120, 121, 122, 123 integrates a function of access to the Internet, and the communication link between said residential gateway with the server 130 is based on the IP protocol (Internet Protocol, as defined in the normative document RFC 791).

In the communication system, messages shall be sent in the form of frames from each terminal device 110, 111 to the server 130. Said server 130 has a role of controlling and collecting information made available by the terminal devices 110, 111, and the gathering gateways 120, 121, 122, 123 have a role of relay between the terminal devices 110, 111 and the server 130. Messages, in particular command messages, can also be transmitted in the form of frames from the server 130 to the terminal devices 110, 111 via the gathering gateways 120, 121, 122, 123. Such commands sent by the server 130 to said terminal devices 110, 111 relate more particularly to transmission rate adjustments, which therefore enables applying adaptive data rate policies ADR, as described below in relation to FIGS. 4 to 6. The transmission rate adjustments can be performed via spread factor SF adjustments. Such commands sent by the server 130 to said terminal devices 110, 111 may also concern transmission power level TxPower adjustments.

To enable fulfilling this role of relay, each gathering gateway 120, 121, 122, 123 has at least one radio interface enabling said gathering gateway to communicate with at least one terminal device 110, 111 while relying on a wireless communication network, and preferentially according to a communication technology of the LPWAN type. Said radio interface is for example of the LoRa type (registered trade mark) thus enabling implementing, in the communication system, a data transmission protocol of the LoRaWAN (registered trade mark) type. Said radio interface is such that a terminal device may be within radio communication range of a plurality of gathering gateways, depending on the geographical position of said terminal device with respect to the gathering gateways 120, 121, 122, 123 and the radio transmission conditions in the environment of said terminal device and of the gathering gateways 120, 121, 122, 123. This is the case for example with the terminal device 110 in FIG. 1, which is within radio communication range of the gathering gateways 120, 121 and 122. The terminal device 111 in FIG. 1 is for its part within radio communication range of the gathering gateways 122 and 123. An example of protocol architecture implemented in the communication system to enable the terminal devices 110, 111 and the server 130 to communicate via the gathering gateways 120, 121, 122, 123 is described below in relation to FIG. 3. If the communication range so permits, and if the server 130 is equipped with a radio interface enabling to communicate directly with the terminal devices 110, 111, then the communication system can dispense with the gathering gateways 120, 121, 122, 123.

Figure 2:
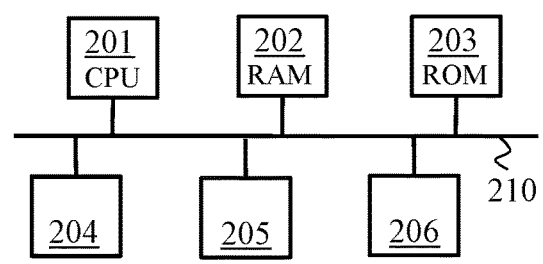
FIG. 2 illustrates schematically an example of hardware architecture of a communication device of the communication system of FIG. 1.

FIG. 2 illustrates schematically an example of hardware architecture of a communication device of the communication system in FIG. 1. Each terminal device 110, 111 and/or each gathering gateway 120, 121, 122, 123 and/or the server 130 may be constructed on the basis of such a hardware architecture.

The communication device comprises, connected by a communication bus 210: a processor or CPU (Central Processing Unit) 201; a random access memory (RAM) 202; a read-only memory (ROM) 203; a storage unit or a storage medium reader, such as an SD (Secure Digital) card reader 204 or a hard disk drive (HDD); a communication interface 205, and optionally another communication interface 206.

When the communication device in FIG. 2 represents a terminal device 110, 111 of the communication system, the communication interface 205 is configured to enable said terminal device to communicate with gathering gateways of the communication system. It should be noted that the communication interface 205 can be configured to enable said terminal device to communicate directly with the server 130.

When the communication device in FIG. 2 represents a gathering gateway 120, 121, 122, 123 of the communication system, the communication interface 205 is configured to enable said gathering gateway to communicate with terminal devices of the communication system, and the other communication interface 206 is configured to enable said gathering gateway to communicate with the server 130.

When the communication device in FIG. 2 represents the server 130, the communication interface 205 is configured to enable said server 130 to communicate with the gathering gateways 120, 121, 122, 123. It should be noted that the communication interface 205 may be configured to enable said server 130 to communicate directly with the terminal devices 110, 111 of the communication system.

The processor 201 is capable of executing instructions loaded into the RAM 202 from the ROM 203, from an external memory, from a storage medium, or from a communication network. When the communication device is powered up, the processor 201 is capable of reading instructions from the RAM 202 and executing them. These instructions form a computer program causing implementation, by the processor 201, of all or some of the algorithms and steps described here in relation to the communication device in question.

Thus, all or some of the algorithms and steps described here may be implemented in software form by execution of a set of instructions by a programmable machine, such as a DSP (Digital Signal Processor) or a microcontroller. All or some of the algorithms and steps described here may also be implemented in hardware form by a machine or a dedicated component, such as a FPGA (Field-Programmable Gate Array) or an ASIC (Application-Specific Integrated Circuit).

Figure 3:
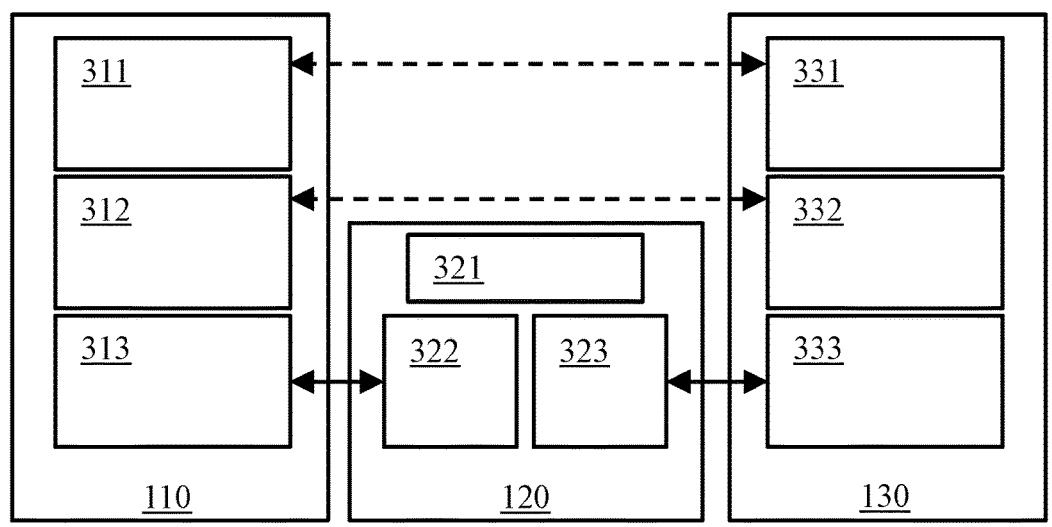
FIG. 3 illustrates schematically an example of protocol architecture implemented in the communication system of FIG. 1.

FIG. 3 illustrates schematically an example of protocol architecture implemented in the communication system in FIG. 1. FIG. 3 illustrates the protocol architecture in a distributed fashion between the terminal device 110, the gathering gateway 120 and the server 130.

The terminal device 110 comprises a top layer 311 and a bottom layer 313, as well as an intermediate layer 312 forming the link between the top layer 311 and the bottom layer 313. The top layer 311 is a client application. The intermediate layer 312 implements the exchange protocol, for example of the LoRaWAN (registered trade mark) type, between the terminal device 110 and the server 130. The bottom layer 313 is the physical layer (PHY) of the radio interface of the terminal device 110, for example of the LoRa (registered trade mark) type, which enables said terminal device 110 to communicate with the gathering gateways of the communication system, such as for example the gathering gateway 120.

The server 130 comprises a top layer 331 and a bottom layer 333, as well as an intermediate layer 332 forming the link between the top layer 331 and the bottom layer 333. The top layer 331 is a server application. The intermediate layer 332 implements the exchange protocol, for example of the LoRaWAN (registered trade mark) type, between the server 130 and the terminal device 110, 111. The bottom layer 333 is the physical layer (PHY) of the server interface 130 which enables communicating with the gathering gateways 120, 121, 122, 123.

The gathering gateway 120 comprises a first bottom layer 322 and a second bottom layer 323, as well as an adaptation module 321. The first bottom layer 322 is the physical layer (PHY) of the radio interface of the gathering gateway 120 which enables communicating with terminal devices of the communication system, such as for example the terminal device 110. The second bottom layer 323 is the physical layer (PHY) of the interface of the gathering gateway 120 which enables communicating with the server 130. The adaptation module 321 is configured to convert the messages received via the first bottom layer 322 into messages adapted to the second bottom layer 323, and vice-versa. During this conversion, the gathering gateway 120 may enrich said message with supplementary information, such as for example a received signal strength indication RSSI determined by said gathering gateway 120 on reception of said message.

The protocol architecture shown in FIG. 3 is such that the intermediate layer 312 of the terminal device 110 communicates with the intermediate layer 332 of the server 130, relying on the respective bottom layers of the terminal device 110 and of the server 130 via the gathering gateway 120. The protocol architecture shown in FIG. 3 is further such that the top layer 311 of the terminal device 110 communicates with the top layer 331 of the server 130, relying on the respective intermediate layers 312, 332 of the terminal device 110 and of the server 130.

The protocol layers and modules shown may be supplemented in particular by protocol stacks enabling the server 130 to exchange with the gathering gateway 120, in particular to enable the server 130 to configure the gathering gateway 120.

FIG. 4 illustrates schematically a look-up table between predefined transmission profiles (corresponding to respective predefined data rates) and respective reception sensitivity levels SL. In the table in FIG. 4, the transmission profiles are represented by respective spread factors SF used in CSS (Chirp Spread Spectrum) modulation. The reception sensitivity levels SL are equivalent to minimum reception signal levels in order to enable decoding signals transmitted respectively according to said predefined transmission profiles.

The look-up table in FIG. 4 thus defines reception sensitivity levels SL for a set of six spread factors SF: SF12, SF11, SF10, SF9, SF8 and SF7. These six spread factors SF correspond more particularly to the spread spectrum parameters defined in the LoRaWAN (registered trade mark) protocol. The spread factors SF are presented here in increasing order of the data rates to which said spread factors SF correspond.

Thus, if for example a frame transmitted by a terminal device is received by a gathering gateway with a received signal strength indication RSSI equal to −129 dBm while said terminal device uses a spread factor SF corresponding to SF12, it can be extrapolated that this frame can be received by said gathering gateway for a transmission spread factor SF corresponding to SF11, or to SF10, or to SF9. By accepting a margin of 3 dBm with respect to the limit sensitivity level, an optimisation would consist of making said terminal device use a transmission spread factor SF corresponding to SF10.

In order to refine the optimisation of the transmission parameters of the terminal device and to avoid untimely changes in configuration of said terminal device, it is proposed that the optimisation take place in successive stages, so that each stage switch is decided according to the delivery rate of frames coming from said terminal device, and that said stage switch is accompanied by an increase in integration time in order to determine said frame delivery rate, as well as an increase in the frame delivery rate to be achieved in order to enable a new stage switch, and a reduction in the margin to be complied with compared with a limit sensitivity level corresponding to the transmission profile actually chosen. An example illustrating various parameters defining the various stages for each terminal device controlled by the server 130 is described below in relation to FIG. 5.

Thus, FIG. 5 illustrates schematically a table defining parameters of stages to be used in the context of a dynamic adaptation of data rate in transmission.

In the table in FIG. 5, the various stages are shown in chronological order in which said stages can be used in the context of the optimisation of the transmission parameters of the concerned terminal device.

The table in FIG. 5 comprises seven columns.

The first column provides, for each stage, a stage identifier ID.

The second column provides, for each stage, information representing a quantity N to be considered for determining a data loss rate (or a frame delivery rate) next serving for the server 130 as an indicator for deciding to base the optimisation on the current stage, or to base the optimisation on the following stage, or optionally to stop or to reinitialise the optimisation. The quantity N thus defines for each stage a series of frames to be analysed for carrying out the optimisation. It should be noted that said quantity N of each stage is less than or equal to said quantity N of the following stage, in order to increase (or stabilise) the integration time at the stage switch.

The third column provides a first frame delivery rate threshold TH1 beyond which the server 130 decides to base the optimisation on the following stage. In an equivalent manner, the first threshold TH1 may be a data loss rate threshold below which the server 130 decides to base the optimisation on the following stage.

The fourth column provides a second frame delivery rate threshold TH2 below which the server 130 decides to stop or reinitialise the optimisation, the second threshold TH2 then being, for each stage, strictly lower than the first threshold TH1. In an equivalent manner, the second threshold TH2 may be a data loss rate threshold beyond which the server 130 decides to stop or reinitialise the optimisation, the second threshold TH2 then being, for each stage, strictly higher than the first threshold TH1.

The fifth column provides information representing a quantity K of worst received signal strength indications RSSI, for a series of N frames under analysis, which shall be rejected in order to determine a minimum received signal strength indication RSSI for said series of N frames under analysis.

The sixth column provides information representing a first margin M1 to be kept between the determined minimum received signal strength RSSI and the reception sensitivity level SL corresponding (according to the table in FIG. 4) to the spread factor SF selected by the optimisation on switching to the following stage.

The seventh column provides information representing a second margin M2 to be kept between the determined minimum received signal strength RSSI and the reception sensitivity level SL corresponding (according to the table in FIG. 4) to the spread factor SF selected by the optimisation when the optimisation keeps the current stage.

The table in FIG. 5 comprises a plurality of stages and, illustratively, four stages. The stages are listed in the order in which said stages can be switched by the optimisation.

Firstly, the table in FIG. 5 comprises an initialisation stage (the identifier ID of which has the value of "1"), for which there is no definition of the second frame delivery rate threshold TH2 below which the server 130 decides to stop or reinitialise the optimisation. In a variant, the second frame delivery rate threshold TH2 may also be defined, for said initialisation stage, according in particular to the parameter N for said initialisation stage. In the example in FIG. 5, for the initialisation stage: the parameter N has the value "1", the first threshold TH1 is therefore 100%, the parameter K has the value "0", the first margin M1 has the value 20 dB, and the second margin M2 has the value 10 dB.

Next the table in FIG. 5 comprises two intermediate stages (the identifiers ID of which have respectively the values "2" and "3"). In the example in FIG. 5, for the intermediate stage having the value "2" for the identifier ID: the parameter N has the value "10", the first threshold TH1 has the value 90%, the second threshold TH2 has the value "70%", the parameter K has the value "1", the first margin M1 has the value 12 dB and the second margin M2 has the value 6 dB. In the example in FIG. 5, for the intermediate stage having the value "3" for the identifier ID: the parameter N has the value "100", the first threshold TH1 has the value 95%, the second threshold TH2 has the value 75%, the parameter K has the value "3", the first margin M1 has the value "6" dB, the second margin M2 has the value 3 dB.

Finally, the table in FIG. 5 comprises a final stage (the identifier ID of which has the value "4"), for which the first margin M1 is not used when switching to the following stage (since there does not exist any stage beyond the final stage) but for deciding to request the concerned terminal device to reduce the transmission power level used by said terminal device. In a variant, the final stage does not comprise any definition of a first margin M1, only a definition of a second margin M2. The server 130 then applies, with regard to the final stage, systematically the second margin M2 when determining the transmission profile to be applied by said terminal device (see details below in relation to FIG. 6). An equivalent approach, as illustrated in FIG. 5, consists of fixing the first margin M1 and the second margin M2 at the same value. In the example in FIG. 5, for the final stage: the parameter N has the value "300", the first threshold TH1 has the value 98%, the second threshold TH2 has the value "75%", the parameter K has the value "10", the first margin M1 has the value 3 dB and the second margin M2 has the value 3 dB.

Thus, for each terminal device that the server 130 is caused to control in order to apply an adaptive data rate policy ADR, the server 130 stores information representing the fact that said terminal device enables, or not, a dynamic adaptation of its transmission parameters. And, when said terminal device enables such a dynamic adaptation of its transmission parameters, the server 130 stores the identifier of the stage that the optimisation of the transmission parameters of said terminal device has currently reached, and the spread factor SF currently used by said terminal device, and optionally the transmission power level TxPower currently used by said terminal device. The server 130 in addition allocates a buffer for storing the K+1 (and therefore dependent on the stage at which the optimisation of the transmission parameters of said terminal device has actually reached) worst received signal strength indications RSSI for a series of frames under analysis, in order to enable the server 130 to finally retain only one received signal strength indication RSSI relevant for the entire series of frames under analysis.

It should be noted that: said quantity N of each stage is less than or equal to said quantity N of the following stage; said first margin M1 of each stage is less than or equal to said first margin M1 of the following stage; and said second margin M2 of each stage is less than or equal to said second margin M2 of the following stage. In addition, with the exception of the initialisation stage that serves to initiate the optimisation, the first frame delivery rate threshold TH1 of each stage is lower than or equal to the first frame delivery rate threshold TH1 of the following stage, and the second frame delivery rate threshold TH2 of each stage is lower than or equal to the first frame delivery rate threshold TH2 of the following stage. The criteria for enabling stage switch are therefore more and more strict as the optimisation progresses among the stages.

The values of the parameters of the table in FIG. 5 are typically defined by experience and/or simulations, and are fixed so as to limit any untimely reconfigurations of the concerned terminal devices.

It should also be noted that it is possible for the server 130 to have a plurality of stage parameter definition tables, and that the server 130 uses such and such a table for optimising the transmission parameters of one or more terminal devices and such and such another table for optimising the transmission parameters of one or more other terminal devices, for example according to the type (capacities, function, etc.) of said terminal devices.

Figure 6:
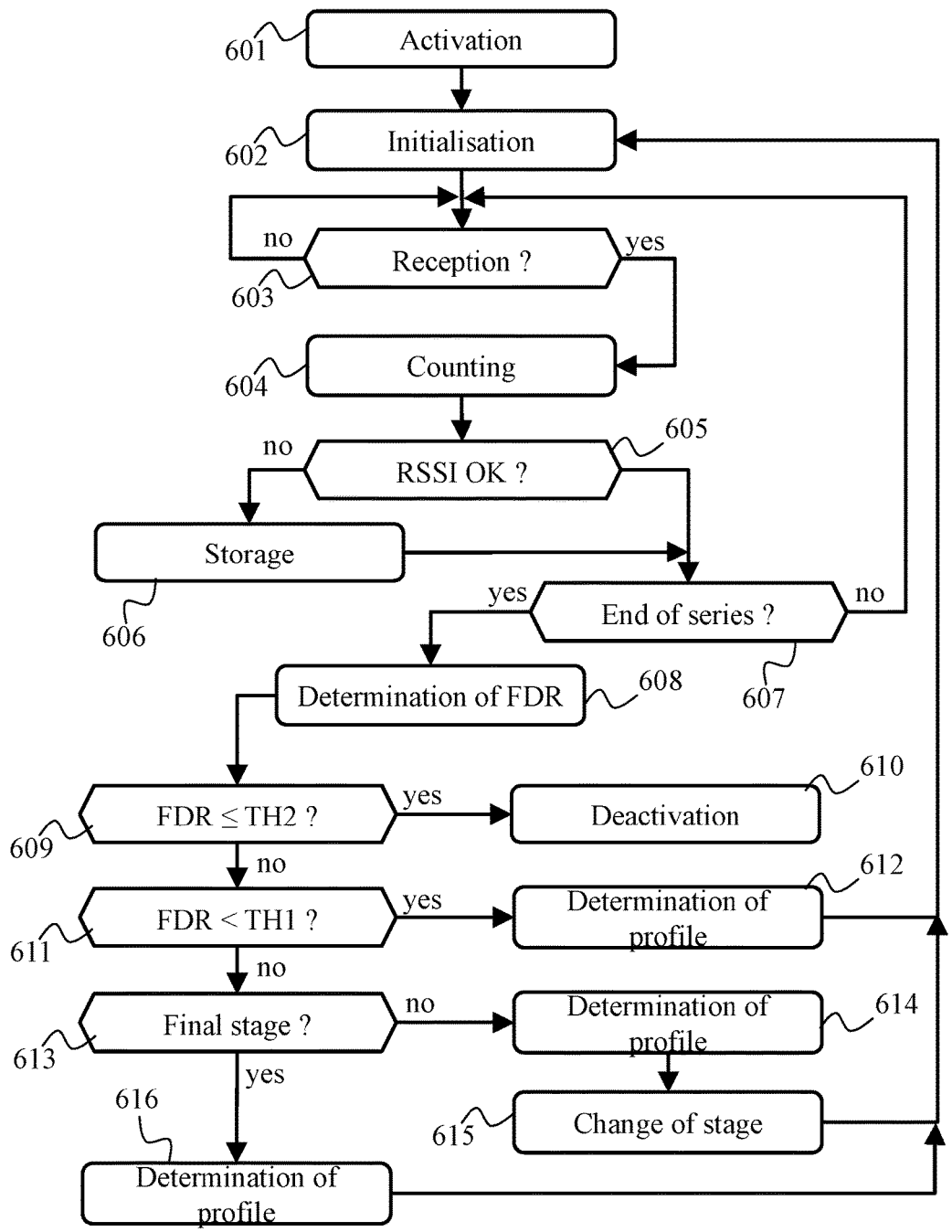
FIG. 6 illustrates schematically a dynamic transmission data rate adaptation algorithm in a particular embodiment of the invention.

FIG. 6 illustrates schematically an algorithm, implemented by the server 130, for dynamic adaptation of the transmission data rate of a terminal device, in a particular embodiment of the invention. Let us consider by way of illustration that the server 130 wishes to optimise the transmission parameters of the terminal device 110 in the context of the communication system in FIG. 1.

It is considered at the start of the algorithm in FIG. 6 that the server 130 and the terminal device 110 are able to perform an optimisation of the transmission parameters of the terminal device 110. Either the communication system is such that the server 130 and all the terminal devices that are attached thereto are able to perform an optimisation of the transmission parameters of said terminal devices; or it is considered that the communication system is heterogeneous, meaning it may comprise devices that are not able to perform such an optimisation. In the latter case, each frame header FH comprises a field FH.ADR (for example in the form of a single bit) indicating whether the device (server or terminal device) is able (bit at "1") or not (bit at "0") to perform such an optimisation. An exchange of frames therefore enables the server 130 and each concerned terminal device to know whether dynamic adaptation of transmission data rate is possible.

In a step 601, the server 130 activates the optimisation of the transmission parameters of the terminal device 110. The initialisation stage is thus selected vis-à-vis the terminal device 110.

In a following step 602, the server 130 initialises the optimisation of the transmission parameters of the terminal device 110. The server 130 in particular makes available a buffer for storing the K+1 worst received signal strength indications RSSI for the future series of frames (K then being chosen, in the stage parameter definition table in FIG. 5, to correspond to the initialisation stage). If the terminal device 110 currently uses (e.g. by default) a transmission rate value, namely a spread factor value SF, which is not known a priori to the server 130, the server 130 sends to the terminal device 110 a command requesting the terminal device 110 to apply a transmission profile chosen (e.g. by default) by the server 130. In the LoRaWAN protocol, this command takes the form of a MAC (Medium Access Control) message of the LinkADRReq type. For example, the terminal device 110 applies transmission parameters involving the lowest data rate in the look-up table between predefined transmission profiles and respective reception sensitivity levels SL (e.g. SF12 in the context of FIG. 4). Furthermore, the server 130 initialises to zero a counter Nb_Rx_Frames intended to count the number of distinct frames received from the terminal device 110.

In a following step 603, the server 130 checks whether said server 130 has received a new frame from the terminal device 110. As already explained, in the context of communications of the LPWAN type, at least one gathering gateway serves as relay between the terminal device 110 and the server 130. It is therefore possible for the server 130 to receive a plurality of copies of the same frame sent by the terminal device 110. Each frame comprises a sequence number chosen by the sender of said frame to allow distinguishing said frame among other frames sent by said sender. The sequence number may be a transmit-frame counter value. The server 130 is then able to eliminate the doublets in the frames received from the gathering gateways acting as relays. The server 130 then retains, for the future, whatever is the worst received signal strength indication RSSI among these doublets. To do this, at each frame received by a gathering gateway from a terminal device, said gathering gateway determines the received signal strength of said frame and supplies to the server 130, in association with said frame, the corresponding received signal strength indication RSSI. Thus, if the server 130 has received a new frame from the terminal device 110, a step 604 is performed; otherwise step 603 is repeated until a new frame from the terminal device 110 is received.

In the step 604, the server 130 increments the counter Nb_Rx_Frames by one unit.

In a following step 605, the server 130 checks whether the received signal indication RSSI for the frame received at the step 603 is among the K+1 worst received signal strength indications RSSI for the series of frames being analysed. If such is the case, a step 606 is performed; otherwise a step 607 is performed.

In the step 606, the server 130 stores, in the buffer made available for this purpose, the received signal strength indication RSSI obtained from the frame received at the step 603. If said buffer now contains K+1 received signal strength indications RSSI, then the server 130 removes from said buffer the best of the received signal strength indications RSSI that are stored therein, and then stores in said buffer the received signal strength indication RSSI obtained for the frame received at the step 603. Next, the step 607 is performed.

In the step 607, the server 130 checks whether the end of the series of N frames to be analysed for the current stage has been reached. The server 130 can determine how many frames have been sent by the terminal device 110 by comparing a transmit-frame counter value that was included in the very first frame received by the server 130 for the series of N frames with a transmit-frame counter value that was included in the very last frame received by the server 130 from the terminal device 110. In the LoRaWAN protocol, these values of the transmit-frame counter are entered in the field FH.FCNT of the respective frame headers FH of said frames. If the end of the series of N frames to be analysed for the current stage has been reached, a step 608 is performed; otherwise, the step 603 is repeated until a new frame is received from the terminal device 110.

In the step 608, the server 130 determines a data loss rate or a frame delivery rate FDR on the series of N frames to be analysed for the current stage. The frame delivery rate FDR is determined by dividing by N the quantity of frames actually received, as represented by the current value of the counter Nb_Rx_Frames. The data loss rate for its part is determined by dividing by N the difference between N and the quantity of frames actually received, as represented by the current value of the counter Nb_Rx_Frames.

In a following step 609, the server 130 checks whether the frame delivery rate FDR determined at the step 608 is less than or equal to the second threshold TH2 defined for the current stage. It should be noted that, if the data loss rate is considered, the server 130 checks whether said data loss rate is higher than or equal to the second threshold TH2 defined for the current stage. If the frame delivery rate FDR determined at the step 608 is less than or equal to the second threshold TH2 defined for the current stage, a step 610 is performed; otherwise a step 611 is performed. It should be noted that, when the second threshold TH2 is not defined for the initialisation stage and the current stage is the initialisation stage, the algorithm then moves directly from the step 608 to the step 611.

In the step 610, the server 130 deactivates (or stops) the optimisation of the transmission parameters of the terminal device 110 and releases the resources that have been allocated for said optimisation, in particular the buffer intended to store the K+1 received signal strength indications RSSI among the frames received from the terminal device 110 in each series of N frames. The algorithm in FIG. 6 is then terminated, after having checked that the terminal device 110 applies a transmission profile chosen (e.g. by default) by the server 130. In a variant embodiment, the server 130 reinitialises the optimisation starting from the first stage, and the step 602 is executed.

In the step 611, the server 130 checks whether the frame delivery rate FDR determined at the step 608 is lower than the first threshold TH1 defined for the current stage. It should be noted that, if the data loss rate is considered, the server 130 checks whether said data loss rate is higher than the first threshold TH1 defined for the current stage. If the frame delivery rate FDR determined at the step 608 is lower than the first threshold TH1 defined for the current stage, a step 612 is performed; otherwise a step 613 is performed.

In the step 612, the server 130 selects a transmission profile corresponding to transmission parameters such that the corresponding reception sensitivity SL (in accordance with the look-up table between predefined transmission profiles and respective reception sensitivity levels SL) satisfies the relationship:

$$RSSI_{K+1} - M2 \leq SL$$

where $RSSI_{K+1}$ represents the best of the received signal strength indications RSSI among the K+1 received signal strength indications RSSI stored in the aforementioned buffer, and K and M2 are dependent on the current stage. In order to obtain $RSSI_{K+1}$, it suffices for the server 130 to remove from the aforementioned buffer the K worst received signal strength indications RSSI that are stored therein. The transmission profile is preferentially chosen so that the corresponding reception sensitivity SL (in accordance with the look-up table between transmission parameters and respective reception sensitivity levels SL) satisfies the above relationship and has the smallest difference from $RSSI_{K+1} - M2$ among the reception sensitivities SL of the predefined transmission profiles. The server 130 then informs the terminal device 110 of the predefined transmission profile selected at the step 612, if the predefined transmission profile selected is different from the transmission profile currently being used by said terminal device 110. In the context of the LoRaWAN protocol, the server 130 uses to do this a message of the linkADRReq type. The step 602 is next repeated, keeping the same stage. The buffer intended to store the K+1 worst received signal strength indications RSSI is emptied, the counter Nb_Rx_Frames is reset to zero, and a new series of N frames is analysed.

In the step 613, the server 130 checks whether the final stage has been reached (last line of the table in FIG. 5). If the final stage has been reached, a step 616 is performed; otherwise a step 614 is performed.

In the step 614, the server 130 selects a transmission profile corresponding to transmission parameters such that the corresponding reception sensitivity SL (according to the look-up table between predefined transmission profiles and respective reception sensitivity levels SL) satisfies the relationship:

$$RSSI_{K+1} - M1 \leq SL$$

where K and M1 are dependent on the current stage. The transmission profile is preferentially chosen so that the corresponding reception sensitivity SL (in accordance with the lookup table between predefined transmission parameters and respective reception sensitivity levels SL) satisfies the above relationship and has the smallest difference from $RSSI_{K+1} - M1$ among the reception sensitivities SL of the predefined transmission profiles. The server 130 then informs the terminal device 110 of the predefined transmission profile selected at the step 614, if said predefined transmission profile selected is different from the transmission profile currently being used by said terminal device 110. In the context of the LoRaWAN protocol, the server 130 uses to do this a message of the linkADRReq type.

In a following step 615, the server 130 selects the next stage. Then the step 602 is repeated. The buffer intended to store the K+1 worst received signal strength indications RSSI is emptied, the size of said memory is updated if the value of the parameter K for the new stage is different from the value of the parameter K for the previous stage, the counter Nb_Rx_Frames is reset to zero, and the new series of N frames is analysed, the value of the parameter N being in agreement with the new stage.

In the step 616, the server 130 selects a predefined transmission profile corresponding to transmission parameters if the corresponding reception sensitivity SL (according to the look-up table between predefined transmission profiles and respective reception sensitivity levels SL) satisfies the relationship:

$$RSSI_{K+1} - M1 \le SL$$

where $RSSI_{K+1}$ represents the best of the received signal strength indications RSSI among the K+1 received signal strength indications RSSI stored in the aforementioned buffer, and K and M1 are dependent on the current stage (the final stage). In order to obtain $RSSI_{K+1}$, it suffices for the server 130 to remove from said aforementioned buffer the K worst received signal strength indications RSSI that are stored therein. The predefined transmission profile is preferentially chosen so that the corresponding reception sensitivity SL (according to the look-up table between predefined transmission profiles and respective reception sensitivity levels SL) satisfies the above relationship and has the smallest difference from $RSSI_{K+1} - M1$ among the reception sensitivities SL of the predefined transmission profiles. The server 130 then informs the terminal device 110 of the predefined transmission profile selected at the step 612, if said predefined transmission profile selected is different from the transmission profile currently being used by said terminal device 110. In addition, the server 130 requests the terminal device 110 to reduce the transmission power TxPower used by the terminal device 110. In the context of the LoRaWAN protocol, the server 130 uses to do this a message of the linkADRReq type. The step 602 is next repeated, keeping the same stage (final stage at this point). The buffer intended to store the K+1 worst received signal strength indications RSSI is emptied, the counter Nb_Rx_Frames is reset to zero, and a new series of N frames is analysed.

As already expressed in relation to FIG. 5, the server 130 may in a variant use the second margin M2 instead of the first margin M1 to determine the transmission profile at the step 616. The difference between the step 612 and the step 616 then lies solely in that the transmission power level is adjusted only at the step 616, namely the frame delivery rate FDR determined at the step 608 is higher than or equal to the first frame delivery rate threshold TH1 as defined for the final stage.

The invention claimed is:

1. A method for dynamic adaptation of a transmission data rate of a terminal device in a wireless communication network, the method being executed by a server in said network, predefined transmission profiles that correspond to respective data rates being associated respectively with reception sensitivities, said reception sensitivities representing minimum signal reception levels for decoding the signals transmitted respectively according to said predefined transmission profiles, wherein the server performs an optimisation of said transmission data rate in successive stages, and wherein each stage defines: a quantity N of frames to be analysed, a first frame delivery rate threshold, a second frame delivery rate threshold lower than said first threshold, a first margin, and a second margin less than or equal to said first margin, so that said quantity N of each stage is less than or equal to said quantity N of the following stage, said first margin of each stage is smaller than or equal to said first margin of the following stage, and said second margin of each stage is smaller than or equal to said second margin of the following stage, and wherein, when the optimisation is performed according to a current stage, the server performs the following steps:

retaining a received signal strength indication for each frame received in a series of N frames transmitted by the terminal device;

determining a frame delivery rate for said series of N frames;

when the determined frame delivery rate is greater than or equal to said first threshold of the current stage, selecting the transmission profile to be applied to said terminal device while keeping at least the second margin of the current stage between the retained received signal strength indication and the reception sensitivity corresponding to said transmission profile, and switching to the following stage;

when the determined frame delivery rate is lower than said first threshold of the current stage and is higher than said second threshold of the current stage, selecting the transmission profile to be applied to said terminal device while keeping the first margin of the current stage between the retained received signal strength indication and the reception sensitivity corresponding to said transmission profile; and when the determined frame delivery rate is below or equal to said second threshold of the current stage, stopping or reinitialising the optimisation.

2. The method according to claim 1, wherein each stage further defines a quantity K of worst received signal strength indications to be rejected by series of N frames, and wherein, for retaining a received signal strength indication for each frame received in a series of N frames transmitted by the terminal device, the server stores the K+1 worst indications of the received signal strength for said series of N frames, and the server retains the best received signal strength indication among the stored received signal strength indications.

3. The method according to claim 1, wherein the optimisation begins with an initialisation stage not defining any second frame delivery rate threshold.

4. The method according to claim 1, wherein the optimisation ends with a final stage and, when the optimisation is performed according to the final stage:

when the determined frame delivery rate is higher than or equal to said first threshold of said final stage, selecting the transmission profile to be applied to said terminal device while keeping at least the second margin of the final stage between the retained received signal strength indication and the reception sensitivity corresponding to said transmission profile, and requesting said terminal device to reduce a transmission power level.

5. The method according to claim 1, wherein the transmission data rate is represented by a spread factor of a CSS modulation.

6. The method according to claim 1, wherein the wireless communication network is a long-range wide-area network of the LPWAN type, wherein the wireless communication network connects the terminal device to at least one gathering gateway serving as a relay with the server, and wherein the server receives each frame relayed by each gathering gateway in association with a received signal strength indication determined by said gathering gateway on reception of said frame.

7. The method according to claim 6, wherein the wireless communication network implements the LoRaWAN protocol.

8. A non-transitory information storage medium storing a computer program comprising a set of instructions causing execution, by a processor of a server intended to be included in a long-range wide area network of the LPWAN type, the method according to claim 1, when said computer program is executed by said processor.

9. A server configured to perform a dynamic adaptation of a transmission data rate of a terminal device in a wireless communication network, predefined transmission profiles that correspond to respective data rates being associated respectively with reception sensitivities, said reception sensitivities representing minimum signal reception levels for decoding signals transmitted respectively according to said predefined transmission profiles, wherein the server is configured to perform an optimisation of said transmission data rate in successive stages, and wherein each stage defines: a quantity N of frames to be analysed, a first frame delivery rate threshold, a second frame delivery rate threshold lower than said first threshold, a first margin, and a second margin smaller than or equal to said first margin, so that said quantity N of each stage is less than or equal to said quantity N of the following stage, said first margin of each stage is less than or equal to said first margin of the following stage, and said second margin of each stage is less than or equal to said second margin of the following stage, and wherein the server is configured, when the optimisation is performed according to a current stage, to:
retain a received signal strength indication for each frame received in a series of N frames transmitted by the terminal device;
determine a frame delivery rate for said series of N frames;
when the determined frame delivery rate is greater than or equal to said first threshold of the current stage, select the transmission profile to be applied to said terminal device while keeping at least the second margin of the current stage between the retained received signal strength indication and the reception sensitivity corresponding to said transmission profile, and switch to the following stage;
when the determined frame delivery rate is lower than said first threshold of the current stage and is higher than said second threshold of the current stage, select the transmission profile to be applied to said terminal device while keeping the first margin of the current stage between the retained received signal strength indication and the reception sensitivity corresponding to said transmission profile; and
when the determined frame delivery rate is less than or equal to said second threshold of the current stage, stop or reinitialise the optimisation.

* * * * *